United States Patent
Toprac et al.

(10) Patent No.: US 6,785,586 B1
(45) Date of Patent: Aug. 31, 2004

(54) METHOD AND APPARATUS FOR ADAPTIVELY SCHEDULING TOOL MAINTENANCE

(75) Inventors: Anthony J. Toprac, Austin, TX (US); Thomas J. Sonderman, Austin, TX (US); Christopher A. Bode, Austin, TX (US); Alexander J. Pasadyn, Austin, TX (US); Joyce S. Oey Hewett, Austin, TX (US); Anastasia Oshelski Peterson, Austin, TX (US); Michael L. Miller, Cedar Park, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 366 days.

(21) Appl. No.: 09/791,981

(22) Filed: Feb. 23, 2001

(51) Int. Cl.[7] .............................................. G06F 19/00
(52) U.S. Cl. ...................... 700/175; 700/100; 700/103; 700/121; 702/182; 702/183; 702/184; 702/185
(58) Field of Search .......................... 700/95, 100, 103, 700/108, 109, 110, 174, 175; 702/182, 183, 184, 185, 186

(56) References Cited

U.S. PATENT DOCUMENTS

| | | | | |
|---|---|---|---|---|
| 5,446,672 A | * | 8/1995 | Boldys | ....................... 700/175 |
| 5,934,974 A | * | 8/1999 | Tzeng | ........................... 451/6 |
| 6,138,056 A | * | 10/2000 | Hardesty et al. | ............ 700/174 |
| 6,217,412 B1 | * | 4/2001 | Campbell et al. | ............... 451/8 |
| 6,326,309 B2 | * | 12/2001 | Hatanaka et al. | ........... 438/693 |

* cited by examiner

Primary Examiner—Leo Picard
Assistant Examiner—Charles Kasenge
(74) Attorney, Agent, or Firm—Williams, Morgan & Amerson, P.C.

(57) ABSTRACT

A method for adaptively scheduling tool maintenance includes controlling an operating recipe of a tool using a plurality of control actions, monitoring the control actions to identify a degraded tool condition, and automatically initiating a tool maintenance recommendation in response to identifying the degraded tool condition. A manufacturing system includes a tool, a process controller, and a tool health monitor. The tool is adapted to process a workpiece in accordance with an operating recipe. The process controller is adapted to control the operating recipe of the tool using a plurality of control actions. The tool health monitor is adapted to monitor the control actions to identify a degraded tool condition and automatically initiate a tool maintenance recommendation in response to identifying the degraded tool condition.

23 Claims, 2 Drawing Sheets

METHOD AND APPARATUS FOR ADAPTIVELY SCHEDULING TOOL MAINTENANCE

BACKGROUND OF THE INVENTION

1. Field of the Invention

This invention relates generally to the field of semiconductor device manufacturing and, more particularly, to a method and apparatus for adaptively scheduling tool maintenance.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender nonoptimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Commonly, a processing tool undergoes periodic preventative maintenance procedures or calibrations to keep the tool in optimum operating condition. For example, polishing tools include polishing pads that are periodically conditioned or replaced. Etch tools and deposition tools are periodically cleaned using both in situ cleans or complete disassembly cleans. Steppers are periodically calibrated to maintain alignment accuracy and exposure dose consistency. Many of these preventative maintenance procedures are performed at discrete intervals based on vendor recommendations, past history, and expected degradation rates of consumable items used in the tools. The use of fixed preventative maintenance intervals is not always an effective solution for optimizing tool and line efficiency. If the maintenance activities are performed more often than actually needed, the efficiency of the line and the operation cost of the tool is increased. If maintenance activities are performed less often than needed, product quality and tool reliability may be degraded.

Another potential drawback of scheduled maintenance intervals is that unexpected conditions may arise during the time period between maintenance activities. For example, the calibration of a tool (e.g., focus on a stepper) may drift outside expected tolerances. A process controller used to control a particular tool may adjust the operating recipe of the tool trying to correct for what it thinks is normal process variation, while in actuality, the variation is caused by the unexpected condition. Over time, the process controller may adjust its performance model based on post-processing metrology feedback. In some situations, the process controller might not be able to stabilize the process. These control problems may result in increased variation or even defective wafers.

The present invention is directed to overcoming, or at least reducing the effects of, one or more of the problems set forth above.

SUMMARY OF THE INVENTION

One aspect of the present invention is seen in a method for adaptively scheduling tool maintenance. The method includes controlling an operating recipe of a tool using a plurality of control actions, monitoring the control actions to identify a degraded tool condition, and automatically initiating a tool maintenance recommendation in response to identifying the degraded tool condition.

Another aspect of the present invention is seen in a manufacturing system including a tool, a process controller, and a tool health monitor. The tool is adapted to process a workpiece in accordance with an operating recipe. The process controller is adapted to control the operating recipe of the tool using a plurality of control actions. The tool health monitor is adapted to monitor the control actions to identify a degraded tool condition and automatically initiate a tool maintenance recommendation in response to identifying the degraded tool condition.

BRIEF DESCRIPTION OF THE DRAWINGS

The invention may be understood by reference to the following description taken in conjunction with the accompanying drawings, in which like reference numerals identify like elements, and in which.

Figure 1:
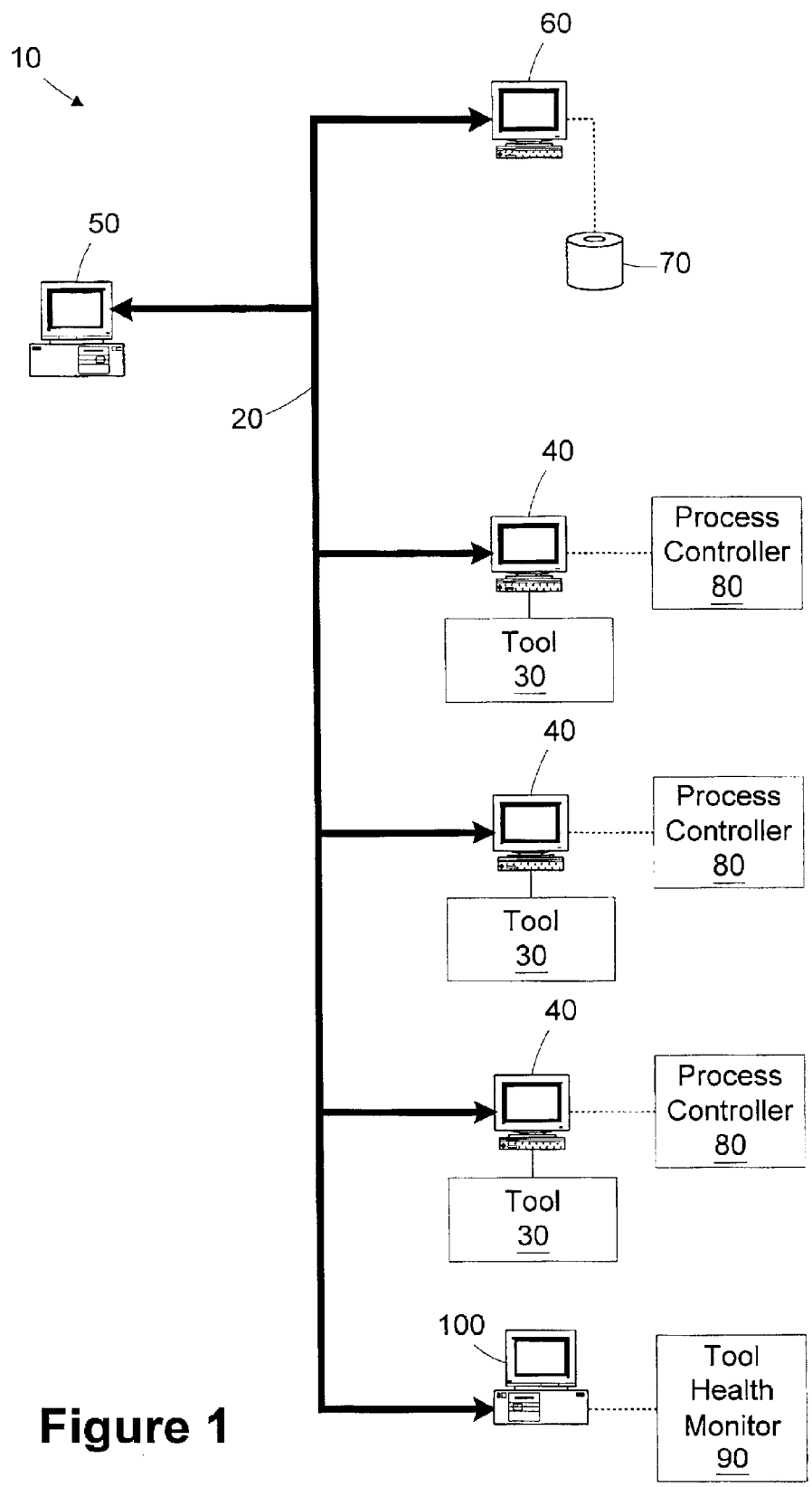
FIG. 1 is a simplified block diagram of an illustrative manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system is adapted to process semiconductor wafers, however, the invention is not so limited and may be applied to other types of manufacturing environments and other types of workpieces. A network 20 interconnects various components of the manufacturing system, allowing them to exchange information. The illustrative manufacturing system 10 includes a plurality of tools 30, each being coupled to a computer 40 for interfacing with the network 20. A process control server 50 directs the high level operation of the manufacturing system 10 by directing the process flow of the manufacturing system 10. The process control server 50 monitors the status of the various entities in the manufacturing system, including the tools 30. A database server 60 is provided for storing data related to the status of the various entities and articles of manufacture (e.g., wafers) in the process flow. The database server 60 may store information in one or more data stores 70. The data may include pre-process and post-process metrology data, tool states, process flow activities (e.g. scheduled maintenance events, processing routes for lots of wafers), etc. The distribution of the processing and data storage functions amongst the different computers 40, 50, 60 is generally conducted to provide independence and a central information store. Of course, more or less computers may be used.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a selfconsistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Some of the tools 30 include process controllers 80 that are adapted to automatically control the operating recipes of their respective tools 30. A particular tool 30 may have more than one process controller 80 adapted to control more than one operating recipe parameter. For example, if the tool 30 is a CMP tool, the process controller 80 may receive pre-polish thickness measurements (e.g., thickness of high features, thickness of low features) and predict a polishing time required to achieve a post-polish target thickness. In the case where the tool 30 is an etch tool, the process controller 80 may model the etching performance of the tool 30 based on pre-etch and/or post-etch thickness measurements. The process controller 80 may use a control model of the tool 30 to generate its prediction. The control model may be developed empirically using commonly known linear or non-linear techniques. The control model may be a relatively simple equation based model (e.g., linear, exponential, weighted average, etc.) or a more complex model, such as a neural network model, principal component analysis (PCA) model, or a projection to latent structures (PLS) model. The specific implementation of the model may vary depending on the modeling technique selected. Using the control model, the process controller 80 may determine operating recipe parameters such as etch time, plasma power, temperature, pressure, reactant gas concentrations, etc. to reduce post-etch thickness variations. Other control scenarios are possible with other types of processing tools 30.

The manufacturing system 10 also includes a tool health monitor 90 operating on a workstation 100 for monitoring the control actions of the process controllers 80. A history of the control actions may be stored in the data stores 70, or alternatively, the process control servers 80 may report their control actions to the tool health monitor 90. The tool health monitor 90 evaluates the control actions of the process controllers 80 to identify potential tool problems requiring maintenance.

The particular control actions monitored by the tool health monitor 90 and the associated maintenance recommendations may vary depending on the particular tool being monitored. Particular control actions and maintenance recommendations are illustrated below for a number of exemplary implementations. Based on identifying a tool health problem, the tool health monitor 90 may schedule a maintenance event with process control server 50, or alternatively, the tool health monitor 90 may send an alert to the process control server 50 for forwarding to a tool operator.

The particular technique employed by the tool health monitor 90 for identifying the tool health problem may vary, depending on the particular tool type, the control actions being evaluated, and the nature of the potential problems that may be experienced by the tool. For example, a control chart with predetermined control limits may be used. If the control action falls outside the control limit, the tool health monitor 90 may signal a tool health problem. A trending analysis may also be used. If a plurality of control actions follow a predetermined increasing or decreasing trend, the tool health monitor 90 may signal the tool health problem. In still another example, the tool health monitor 90 may analyze a change in a control variable versus a change in the measured wafer characteristic used as a feedback variable for the control model employed by the process controller 80. If a change in the control variable does not result in a change to the measured wafer characteristic, the tool health monitor 90 may signal the tool health problem.

In a first illustrative example, the tool 30 is a photolithography stepper. The stepper 30 exposes a layer of photoresist to define a pattern in the photoresist layer. The patterned layer of photoresist is then used to etch features, such as lines, trenches, or gate electrodes, on process layers (e.g., metal, polysilicon, or dielectric material) formed on the wafer. Metrology data, such as the dimensions of the features formed in the patterned photoresist layer or the actual dimensions of the features formed in the underlying process layer, is collected and analyzed by the process controller 80 to change the operating recipe of the stepper 30. For example, the process controller 80 associated with the stepper 30 may control exposure dose as a function of the critical dimensions. Based on the metrology data, the process controller 80 may increase or decrease the exposure dose in response to a deviation between a measured critical dimension and a target critical dimension in accordance with a control model.

The tool health monitor 90 monitors the control actions of the process controller 80 to identify problems with the stepper 30. For example, the process controller 80 may change the exposure dose without a corresponding change to the critical dimension measurements. This scenario is indicative of a focus problem with the stepper 30. The tool health monitor 90 may identify the focus problem based on recognizing this trend and issue a maintenance recommendation or alert message to the process control server 50.

In a second illustrative example, the tool 30 is a polishing tool adapted to perform a clerical-mechanical polishing procedure for planarizing a process layer formed on the wafer. In general, the polishing tool 30 uses a polishing pad and a chemical slurry to perform the polishing process. A number of control variables may be adjusted by the process controller 80 to control the thickness and topology of the polished process layer. For example, the process controller 80 may control the speed of the polishing pad, the force applied to the polishing pad, the polishing time, the range of motion on the polishing arm, etc. Metrology data, such as the thickness of the polished layer and the topology of the polished layer (i.e., flat, dished, or domed) is collected and analyzed by the process controller 80 to change the operating recipe of the polishing tool 30. For example, the process controller 80 may adjust polishing time as a function of the thickness measurement of the polished process layer. Based on the metrology data, the process controller 80 may increase or decrease the polishing time in response to a deviation between a measured critical dimension and a target critical dimension in accordance with a control model.

The tool health monitor 90 monitors the control actions of the process controller 80 to identify problems with the polishing tool 30. For example, the process controller 80 may change the polishing time without a corresponding change to the post-polish thickness measurement. This scenario is indicative of a degraded polishing pad, a problem with the chemical slurry composition, or a misalignment of the polishing arm. The tool health monitor 90 may identify a problem with the polishing tool 30 and issue a maintenance recommendation or alert message to the process control server 50.

Figure 2:
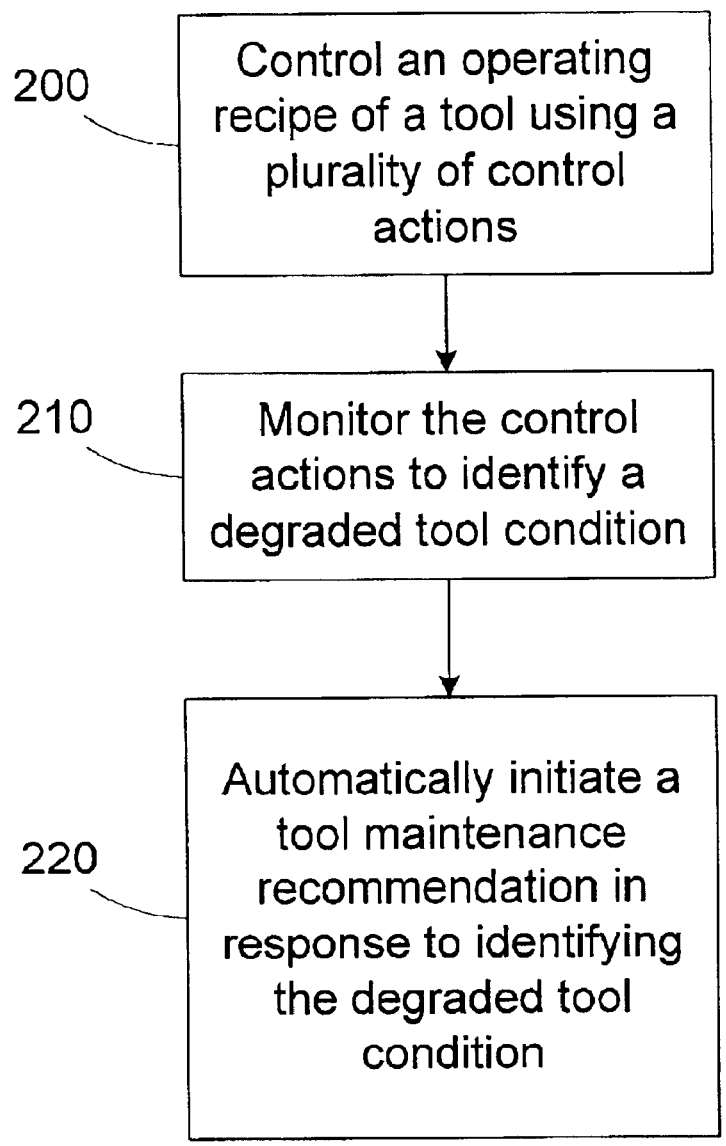
FIG. 2 is a simplified flow diagram of a method for adaptively scheduling tool maintenance in accordance with another illustrative embodiment of the present invention.

Turning now to FIG. 2, a simplified flow diagram of a method for adaptively scheduling tool maintenance in accordance with another illustrative embodiment of the present invention is provided. In block 200, the operating recipe of a tool is controlled using a plurality of control actions. The process controller 80 for the tool is adapted to initiate the control actions based on metrology data related to the process it performs and an associated target characteristic for the process. In block 210, the control actions are monitored (e.g., by the tool health monitor 90) to identify a degraded tool condition. As discussed above, various types of monitoring may be used depending on the particular tool and process being performed. Monitoring may include identifying a control limit violation, identifying an adverse trend, or identifying control actions without corresponding improvements in process performance, for example. In block 220, a tool maintenance recommendation is automatically initiated by the tool health monitor 90 in response to identifying the degraded tool condition.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for adaptively scheduling tool maintenance, comprising:

controlling an operating recipe of a tool using a plurality of control actions that modify the operating recipe;

monitoring the control actions to identify a degraded tool condition; and automatically initiating a tool maintenance recommendation in response to identifying the degraded tool condition.

2. The method of claim 1, wherein monitoring the control actions comprises:

comparing the control actions to a control limit; and identifying the degraded tool condition in response to at least one of the plurality of control actions exceeding the control limit.

3. The method of claim 1, wherein monitoring the control actions comprises:

identifying an adverse trend in the control actions; and identifying the degraded tool condition in response to identifying the adverse trend.

4. The method of claim 1, wherein the operating recipe has an associated target value, and monitoring the control actions comprises:

comparing a characteristic of a first workpiece processed prior to a particular control action to a characteristic of a second workpiece processed after the particular control action;

determining if the characteristic of the second workpiece is closer to the target value that the characteristic of the first workpiece; and identifying the degraded tool condition in response to the characteristic of the second workpiece not being closer to the target value than the characteristic of the first workpiece.

5. The method of claim 1, wherein automatically initiating the tool maintenance recommendation comprises scheduling a maintenance event for the tool.

6. The method of claim 1, wherein automatically initiating the tool maintenance recommendation comprises sending a maintenance alert message to an operator of the tool.

7. The method of claim 1, wherein the tool comprises a photolithography stepper, controlling the operating recipe of the tool comprises adjusting the exposure dose of the photolithography stepper, and monitoring the control actions comprises determining if a control action modifying the exposure dose results in a corresponding change to a critical dimension of a wafer processed in accordance with the modified exposure dose.

8. The method of claim 7, wherein initiating the tool maintenance recommendation comprises initiating a maintenance recommendation for a focus check on the photolithography stepper.

9. The method of claim 1, wherein the tool comprises a polishing tool, and controlling the operating recipe of the tool comprises adjusting at least one of a polishing time, and a polishing speed, a polishing force, a polishing arm range of motion parameter in the operating recipe.

10. The method of claim 1, wherein the tool comprises a polishing tool, controlling the operating recipe of the tool comprises adjusting a polishing speed of the polishing tool with each control action, and monitoring the control actions comprises monitoring a trend in the polishing time.

11. The method of claim 10, wherein initiating the tool maintenance recommendation comprises initiating a maintenance recommendation for a polishing pad replacement on the polishing tool.

12. A manufacturing system, comprising:

a tool adapted to process a workpiece in accordance with an operating recipe;

a process controller adapted to control the operating recipe of the tool using a plurality of control actions that modify the operating recipe; and a tool health monitor adapted to monitor the control actions to identify a degraded tool condition and automatically initiate a tool maintenance recommendation in response to identifying the degraded tool condition.

13. The system of claim 12, wherein the toll health monitor is adapted to compare the control actions to a control limit and identify the degraded tool condition in response to at least one of the plurality of control actions exceeding the control limit.

14. The system of claim 12, wherein the tool health monitor is adapted to identify an adverse trend in the control actions and identify the degraded tool condition in response to identifying the adverse trend.

15. The system of claim 12, wherein the operating recipe has an associated target value, the tool health monitor is adapted to compare characteristic of a first workpiece processed prior to a particular control action to a characteristic of a second workpiece processed after the particular control action, determine if the characteristic of the second workpiece is closer to the target value, and identify the degraded tool condition in response to the second workpiece not being closer to the target value than the characteristic of the second workpiece.

16. The system of claim 13, wherein the tool health monitor is adapted to schedule a maintenance event for the tool.

17. The system of claim 12, wherein the tool health monitor is adapted to send a maintenance alert message to an operator of the tool.

18. The system of claim 12, wherein the tool comprises a photolithography stepper, the process controller is adapted to control the exposure dose of the photolithography stepper, and the tool health monitor is adapted to identify the degraded tool condition by determining if a control action modifying the exposure dose results in a corresponding change to a critical dimension of a wafer processed in accordance with the modified exposure dose.

19. The system of claim 18, wherein the tool maintenance recommendation comprises a maintenance recommendation for a focus check on the photolithography stepper.

20. The system of claim 12, wherein the tool comprises a polishing tool, and the process controller is adapted to adjust at least one of a polishing time, and a polishing speed, a polishing force, a polishing arm range of motion parameter in the operating recipe.

21. The system of claim 12, wherein the tool comprises a polishing tool, the process controller is adapted to adjust a polishing speed of the polishing tool with each control action, the tool health monitor is adapted to monitor the control actions to identify a trend in the polishing time.

22. The system of claim 21, wherein, the tool maintenance recommendation comprises a maintenance recommendation for a polishing pad replacement on the polishing tool.

23. A system for adaptively scheduling tool maintenance, comprising:

means for controlling an operating recipe of a tool using a plurality of control actions that modify the operating recipe;

means for monitoring the control actions to identify a degraded tool condition; and means for automatically initiating a tool maintenance recommendation in response to identifying the degraded tool condition.

* * * * *

UNITED STATES PATENT AND TRADEMARK OFFICE
CERTIFICATE OF CORRECTION

PATENT NO.     : 6,785,586 B1
DATED          : August 31, 2004
INVENTOR(S)    : Anthony J. Toprac et al.

It is certified that error appears in the above-identified patent and that said Letters Patent is hereby corrected as shown below:

Column 8,
Line 10, change "toll" to -- tool --.
Line 21, after "compare" insert -- a --.

Signed and Sealed this

Twenty-first Day of December, 2004

JON W. DUDAS
*Director of the United States Patent and Trademark Office*